Sept. 25, 1945.    V. WEBER    2,385,434
TEMPERATURE REGULATING DEVICE FOR HEATING APPLIANCES
Filed March 9, 1940    4 Sheets-Sheet 1

INVENTOR
Victor Weber

Sept. 25, 1945.  V. WEBER  2,385,434
TEMPERATURE REGULATING DEVICE FOR HEATING APPLIANCES
Filed March 9, 1940  4 Sheets-Sheet 2

INVENTOR
Victor Weber
By Stebbins, Blenko
& Parmelee
Attorneys

Sept. 25, 1945. V. WEBER 2,385,434
TEMPERATURE REGULATING DEVICE FOR HEATING APPLIANCES
Filed March 9, 1940 4 Sheets-Sheet 3
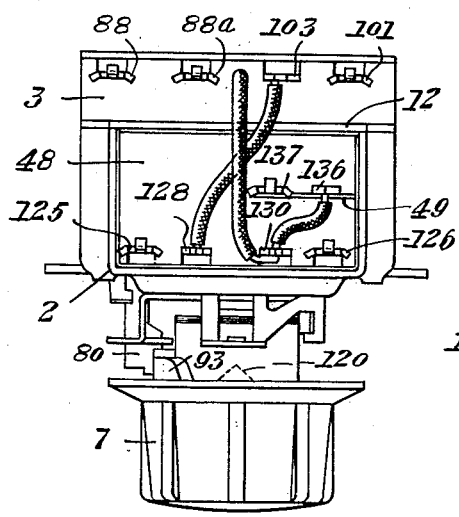
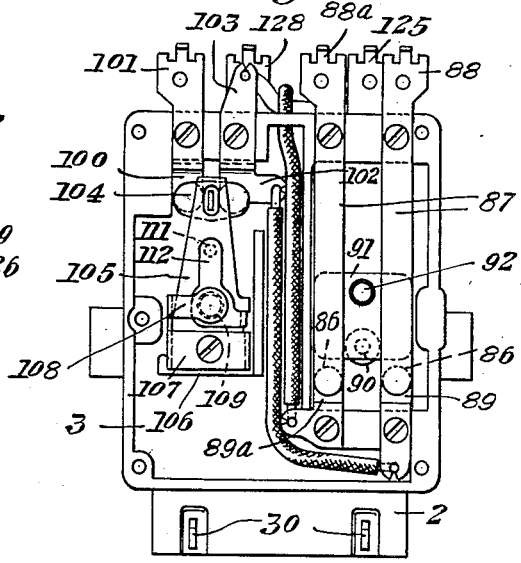
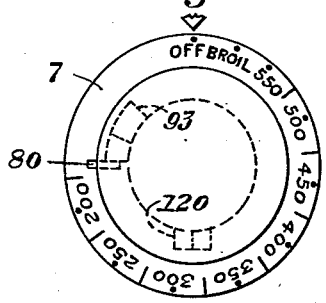
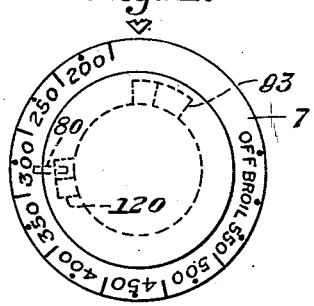
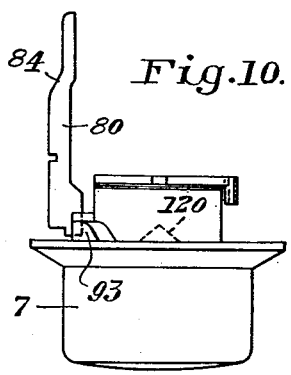
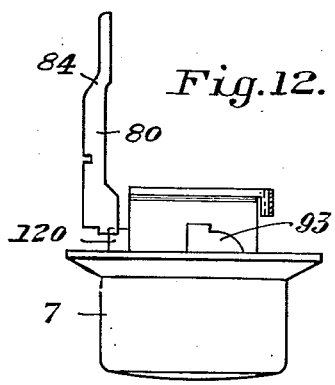
INVENTOR
Victor Weber

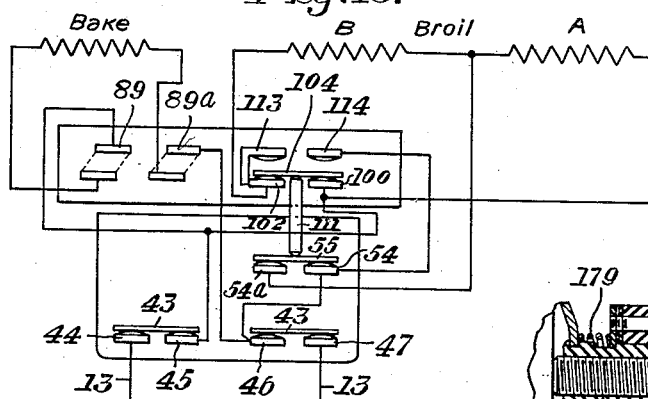
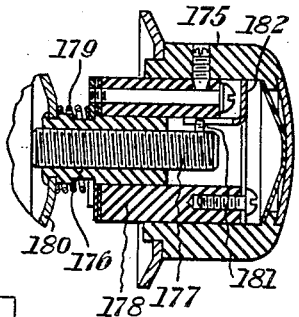
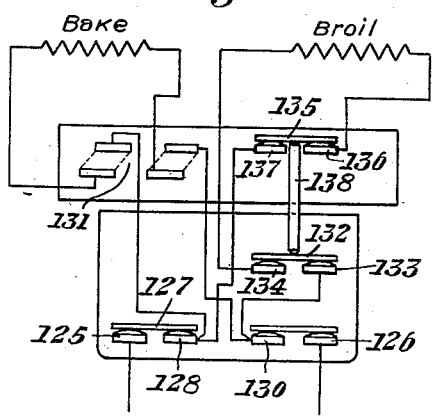
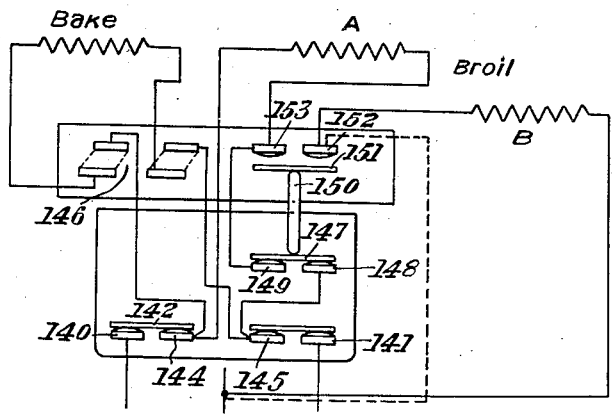

Patented Sept. 25, 1945

2,385,434

UNITED STATES PATENT OFFICE 2,385,434

TEMPERATURE REGULATING DEVICE FOR HEATING APPLIANCES

Victor Weber, Greensburg, Pa., assignor to American Thermometer Company, St. Louis, Mo., a corporation of Delaware Application March 9, 1940, Serial No. 323,162

7 Claims. (Cl. 219—20)

The present invention relates generally to heating appliances and, more particularly, to thermostatically actuated devices for controlling the operation of the apparatus used for controlling the supply of heat to the appliance. The present invention is particularly adapted to the control of the operation of electric ranges and other electric heating appliances. Although applicable to various other types of electric appliances the present invention will be described herein as applied to electric ranges.

It has been found desirable in electric ranges to provide an element in the lower portion of the oven which is used primarily for baking purposes, and an element in the upper portion of the oven primarily used for broiling purposes. While these elements are normally used separately for baking and broiling purposes, it has been found desirable to utilize both the lower or bake element and the upper or broil element at the same time in order to rapidly preheat the oven to the desired temperature. It has also been found desirable in some cases during a baking operation to have the broil element also connected to the power source but at a reduced voltage, so as to provide some top heat during the baking operation in addition to the principal baking heat supplied by the lower or baking element.

Prior to the making of the present invention ranges equipped with a bake element and a broil element were provided with a separate selector switch in addition to the thermostatically actuated switch mechanism for controlling the temperature. In such ranges the selector switch is used for connecting either the bake element or the broil element or both to the current source. Where both elements are connected to the current source at one time the thermostatically actuated switch will operate to disconnect both of these elements simultaneously from or to connect them simultaneously to the power source. Where one of the elements is connected to the power source by the selector switch that element only will be connected to or disconnected from the power source by the operation of the thermostat. In the normal operation of a range having both a broil element and a bake element it is particularly desirable at times to preheat the oven before placing the food in it. In such cases it is desirable to bring the temperature of the oven up to an appropriate cooking temperature relatively rapidly and, in order to do this, it is necessary to set the thermostat by an appropriate adjusting dial and to turn the selector switch from the "off" position to a preheat position in which both the upper and lower heating elements will be connected to the power source and in such a way that full voltage will be impressed upon both. After the desired temperature is reached the food to be cooked may then be placed in the oven, but it is necessary for the operator to then manually turn the selector switch to either the "bake" position or to the "broil" position, whichever is desired. It is necessary for the operator to remember that the selector switch has to be manually turned to the proper position after the preheating operation has been accomplished. If the operator forgets to make this adjustment the food being cooked may be spoiled. It will be appreciated that the two operations necessary in order to carry out a cooking operation of this character are spaced apart a substantial period of time. This is quite objectionable because the operator may fail to make the necessary adjustment.

By the present invention I provide a structure which obviates this objectionable feature of the prior art devices and which needs only to be set once for the purpose of carrying out any desired heating operation. The structure which I provide is also of such character that the entire mechanism can be adjusted to the desired operating temperature and to the desired heating operation by means of a single control dial. By the structure which I provide it is only necessary to appropriately position the dial at the outset and thereafter the entire desired cooking operation can be carried out without the necessity of any further adjustment of the connections or of the thermostat itself. In addition, this same single control dial operates to completely disconnect the structure from the power source, and it does so in such a way that there is no danger whatever, due to a lowering of the surrounding temperature, of the switch mechanism automatically connecting the heating elements to the power source at an inappropriate time.

In accordance with the present invention I provide a heating arrangement and structure embodying a thermally responsive element for controlling the operating temperatures by appropriate operation of switch mechanism and means for automatically modifying the connections during the heating operation upon the oven reaching a predetermined temperature. In the structure which I provide, the thermostatically actuated mechanism automatically actuates appropriate switch mechanism to disconnect one of the heating elements from the line or to change the connections to said heating element, and this mechanism is arranged so that the disconnected element will not again be connected to the power source or its original connections restored until the device is again manually operated. In the structure which I provide by my invention I have combined a thermostatic control, a switch for controlling the broil element or elements, and a switch for controlling the bake element in such a manner that with the operation of a single adjusting dial it is possible to accomplish everything that could formerly be accomplished only by the provision of a thermostat and a separate selector switch, each having its own operating handle.

In the operation of the structure which I provide, when the adjusting dial is in the "off" position the operating parts are so arranged that both the bake element and the broil element are disconnected from the power source. If it is desired to effect a preheating operation and to follow the preheating operation with a baking operation, it is merely necessary to rotate the adjusting dial in such a manner as to connect both the broil and the bake elements to the line. In one embodiment of the invention, as shown in my copending application, Serial No. 247,390, filed December 23, 1938, of which the present application is a continuation-in-part, the adjusting dial is turned to the "broil" position and then turned to an intermediate position representing the desired baking temperature. In another embodiment of my invention it is only necessary to turn the adjusting dial directly to the intermediate position as appropriate mechanism is provided for causing both the broil and the bake elements to be connected to the line upon rotation of the dial above any desired temperature. In another embodiment of my invention, it is only necessary to move the adjusting dial axially and to turn it to the desired operating temperature. The axial movement actuates the broil switch mechanism to operative position. Both the bake and broil elements are in this manner connected to the line. When the oven reaches the temperature set on the adjusting dial the switch mechanism provided is automatically actuated and the broil element permanently disconnected from the line during the continuance of the heating operation. The thermostatically actuated switch mechanism moves back and forth to connect the bake element only to or disconnect it from the power source.

In some installations it is desirable to maintain some heat in the broil element during a baking operation and, in order to accomplish this by the structure which I provide, it is only necessary to provide appropriate connections so that upon the automatic actuation of the switch mechanism when the temperature has reached the desired point, the connections will be modified so that current at a reduced voltage will be supplied to the broil element during the continuance of the heating operation. When an arrangement of this character is utilized, the broil element at reduced voltage and the bake element are connected to and disconnected from the line by the thermostat in accordance with the operating temperatures.

In some cases it is desirable to connect only the bake element to the power source or to connect the bake element at full voltage and the broil element at a reduced voltage to the power source at the commencement of the heating operation, without any preliminary preheating of the oven. This is accomplished in the structure which I provide by merely setting the adjusting dial to the desired temperature.

In other occasions it is desirable to connect the broil element only to the line or power source without any preheating operation. In the structure which I provide this can be accomplished by merely rotating the adjusting dial to the "broil" position. This operation of the dial to the appropriate position connects the broil element to the line so that it will obtain full voltage and also causes it to disconnect the bake element from the line, so that at no time during the continuance of the heating operation will it receive current.

As stated above, this variety of operating conditions can be obtained in the structure which I provide by a single control dial which selects the desired operating conditions and the desired operating temperatures.

In the accompanying drawings I have shown for purposes of illustration only a preferred embodiment and several modifications of my invention. In the drawings Figure 1 is a front elevation of the structure which I provide;

Figure 9 is a front elevation of the adjusting dial;

Figure 10 is a plan view of the adjusting dial and a portion of the cooperating mechanism;

Figure 11 is a view similar to Figure 9 showing the dial in a different adjusting position;

Figure 12 is a top plan view of the adjusting dial and the cooperating mechanism shown in Figure 11;

Figure 13 is a top plan view of a modified form of my invention;

Figure 14 is a rear elevational view of the structure shown in Figure 13;

Figure 15 is one wiring diagram for the structure shown in Figures 1 to 12 inclusive;

Figure 16 is a wiring diagram for the structure shown in Figures 13 and 14;

Figure 17 is a wiring diagram applicable to the structure shown in Figures 1 to 12 inclusive when modified slightly; and Figure 18 is a longitudinal section of the adjusting dial of a modified form of the invention.

Figure 1:
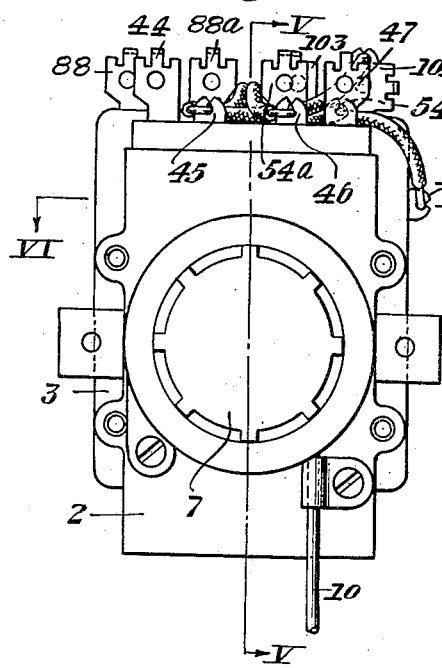
Figure 4:
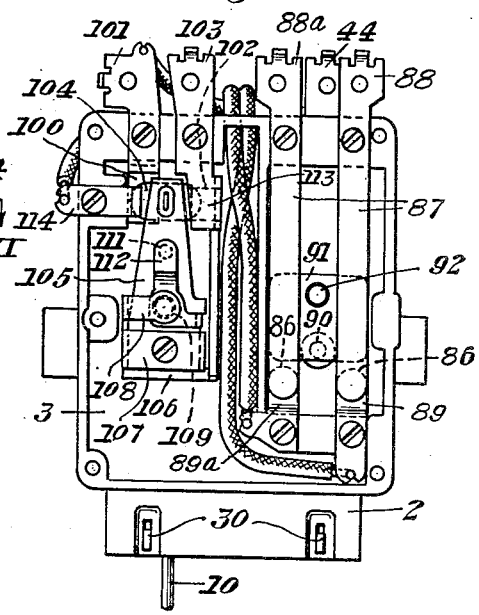
Figure 4 is a section taken along the line IV—IV of Figure 2.
Figure 2:
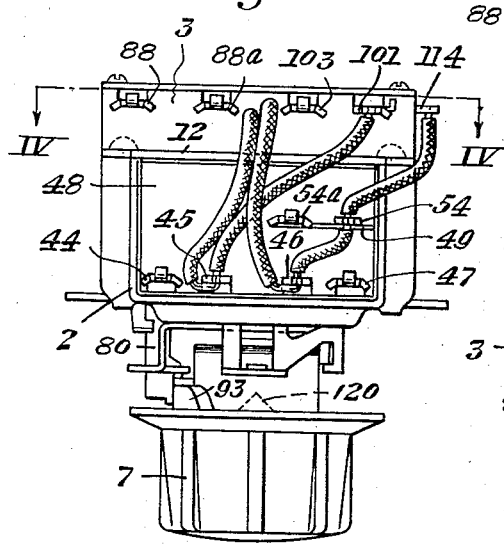
Figure 2 is a top plan view of the structure shown in Figure 1.
Figure 3:
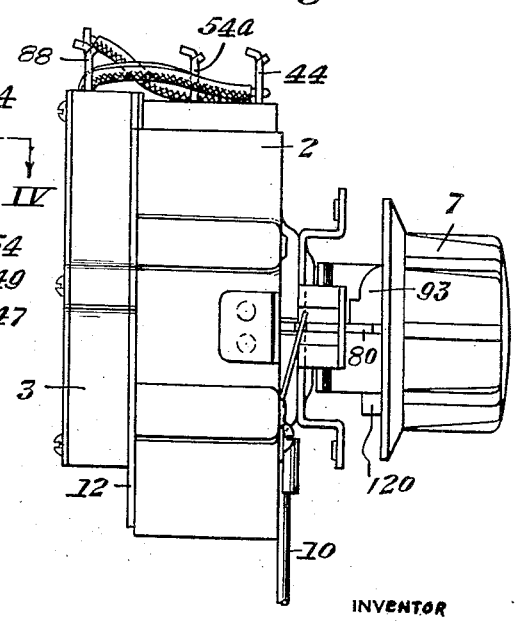
Figure 3 is a side elevational view of the structure shown in Figure 1.

The embodiment of the invention shown in Figures 1 to 12 inclusive will be described first. In this embodiment the operating levers are mounted in a main housing indicated generally by the reference character 2, and in the rear housing indicated generally by the reference character 3. The front cover 4 of the main housing has an opening 5 therethrough, through which a threaded screw 6 extends. This screw cooperates with the adjusting dial 7 for adjusting the device and for setting the various switch elements so as to operate in the desired manner. The threaded adjusting screw 6 is supported in a bushing 8 which is rigidly secured to the front cover 4. This bushing is interiorly threaded for cooperation with the adjusting screw 6, so that the screw will move inwardly or outwardly as it is rotated by the adjusting dial 7. The inner end of the screw engages a stud which is attached to the front of the expansible and contractible diaphragm 9 so as to support the diaphragm and to move it inwardly or outwardly in accordance with the movement of the stud.

The interior of the diaphragm 9 is in direct communication with a capillary tube 10 which is in turn in communication with the interior of the bulb which is positioned in the oven or other chamber, the temperature of which is being controlled. A contractible and expansible liquid is provided in the bulb and the capillary tube 10 so that upon expansion of the liquid as a result of the heat to which the bulb is subjected, the liquid will be forced through the tube into the expansible and contractible diaphragm 9, thereby actuating the diaphragm to a sufficient extent to operate the parts to be described for shutting off or turning on the supply of current to the oven. A tip 11 is provided on the face of the diaphragm opposite the stud to facilitate the transmission of the expansive forces of the diaphragm to the operating levers.

The tip 11 bears against a button or raised portion 14 in the recessed portion 15 of the main operating lever 16. The operating lever 16 has a knife edge 17 at its upper end which is seated in V-shaped bearings 18 in a U-shaped bracket 19, which is secured to the rear wall 12 of the main housing. The lower end of the main operating lever 16 is U-shaped to provide a space between the legs 20 for the reception of a tension spring 21. The lower end of the main operating lever is provided with a knife edge 22 which cooperates with one end of the tension spring 21. The upper end of the tension spring 21 extends through an opening 23 in the R-shaped secondary operating lever or contact arm 24. The opening 23 is provided with a knife edge 25 for cooperation with the spring, so that there will be relatively little or no friction to affect the operation of the structure.

Each leg 26 of the secondary lever or contact arm 24 has a knife edge 27. The knife edges 27 rest in V-shaped bearings 28 formed in a bracket 29. The rear end of the bracket 29 is provided with arms 30 which extend slightly through and are supported by the rear wall 12 of the main housing. The front end of the bracket 29 is provided with a screw 31, the bottom end of which rests on the bottom of the main housing. This screw can be threaded through the bracket so as to raise or lower it and thereby effect an adjustment of the operating range of the levers. The secondary lever 24 is provided with an opening 32 so as to permit the tip 11 carried by the diaphragm to extend past it and to contact the button 14 carried by the main operating lever.

A take-up arm 38, which is of inverted U-shape in general configuration, is provided for cooperation with the secondary lever or contact arm 24. The legs 39 of the take-up arm are provided at their lower ends with projections or bearings 40 which extend outwardly from the general plane of the take-up lever. These bearings 40 rest on inwardly projecting ledges or bearings 41 formed on the contact arm 24. The upper end of the take-up arm 38 extends above the upper end of the contact arm 24 and carries an insulating bar 42. This insulating bar is mounted on the upper end of the take-up arm in such a way as to permit a slight pivoting in a horizontal plane. This facilitates the alinement of the contact bridges 43 which are carried by the insulating bar. The contact bridges 43 cooperate with the contacts 44, 45, 46 and 47 which are supported on the insulating block 48 supported on the rear wall 12 of the main housing. The block 48 also carries an insulating plate 49 which extends downwardly behind the take-up arm and limits the movement thereof in a contact breaking direction.

The take-up arm 38 is provided with a hook 50 which extends around the under side of the top cross piece of the secondary lever or contact arm 24. This hook 50 limits the movement of the take-up arm in respect to the contact arm 24. A spring 51 normally urges the take-up arm toward the contact arm 24. One end of this spring abuts the rear face of the take-up arm and the other arm abuts a washer 52 carried by a stud 53 which is carried by the contact arm at its upper end.

Figure 5:
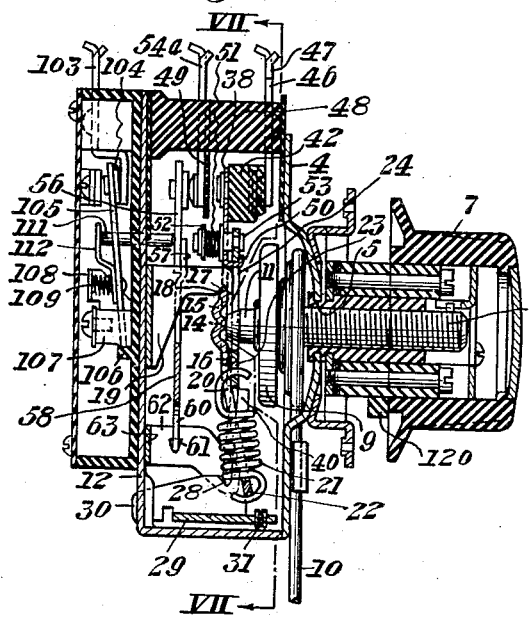
Figure 5 is a section taken along the line V—V of Figure 1.
Figure 7:
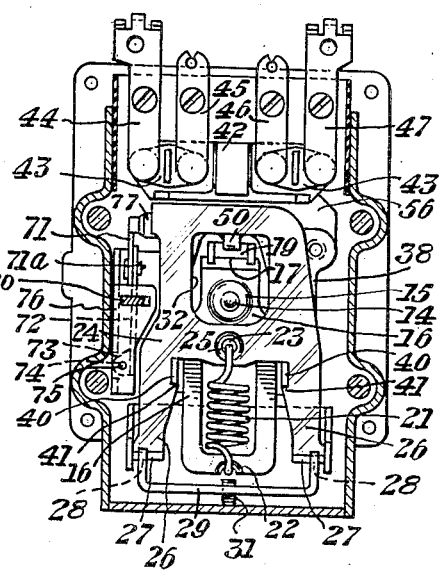
Figure 7 is a section taken along the line VII—VII of Figure 5.
Figure 6:
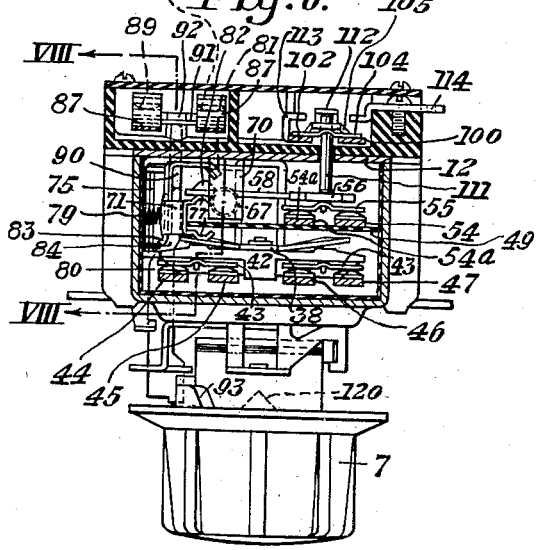
Figure 6 is a section taken along the line VI—VI of Figure 1.
Figure 8:
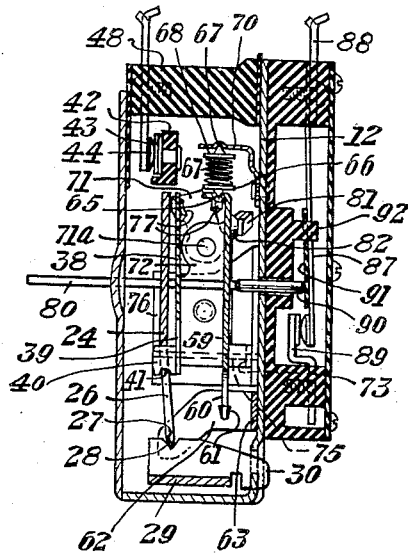
Figure 8 is a section taken along the line VIII—VIII of Figure 6.

It will be seen from the above description that as the liquid in the bulb and in the capillary tube 12 expands and responds to the temperatures prevailing in the oven, the diaphragm 9 will expand and this will force the lower end of the thermostatically actuated main lever 16 past the pivot point of the contact arm 24, and due to the spring tension the contact arm and the take-up arm will be moved to the left as shown in Figure 5, thus breaking the contact between the contact bridges 43 and the contacts 44, 45, 46 and 47, thereby interrupting the flow of current to the heating elements. The flow of current to the heating elements is interrupted in this manner due to the fact that, as shown in Figure 15, the power lines 13 are connected to the contacts 44 and 47. So long as the diaphragm 9 remains in the expanded position the current will be interrupted, but on cooling down of the oven the diaphragm will contract and, as soon as the lower end of the lever 16 passes the pivot point in the other direction, the contact arm 24 and the take-up arm will be moved to the right as viewed in Figure 5, so that the current will be permitted again to pass through the heating element so long as the circuit is not interrupted elsewhere.

Contacts 54 and 54a are mounted on the insulation plate 49 in the main housing. These contacts are connected into the broil element circuit. A contact bridge 55 is provided for bridging the contacts 54 and 54a. The bridge 55 is carried on an insulated extension 56 of the arm 57 of the broil lever 58. The broil lever 58 is H-shaped in general configuration and is provided with the arm 57 and another upstanding arm 59. It is also provided with leg portions 60 which are pivotally mounted in openings 61 in the forwardly extending legs 62 of the bracket 63. The bracket 63 is secured to the rear wall 12 of the main housing. The legs 62 of the bracket 63 extend horizontally beyond the openings 61 and beyond the legs of the broil lever and their outer ends are positioned adjacent the legs of the contact arm 24 for the purpose of preventing these legs from sliding sidewise from their bearings. The arm 59 of the broil lever is provided with a tapered depression 65 which cooperates with a cone-shaped disk 66. One end of a spring 67 abuts the disk 66 and the other end of this spring carries a similar disk 68 which cooperates with a depression 69 in a bracket 70 carried by the rear wall of the main housing. The spring 67 is normally under compression and, consequently, it will maintain the broil lever 58 in any position to which it is moved on either side of the pivot on which it is mounted. When the upper end of the broil lever is moved past the pivot point, as shown in Figure 5, the spring arrangement just described will operate to snap the contact bridge 55 into engagement with the contacts 54 so as to permit current to pass to the broil element under certain conditions. If the broil lever is moved to the left, as shown in Figure 5, a sufficient distance to pass the pivot point, then the spring arrangement will serve to hold the broil lever away from the contacts 54 and 54a, thus maintaining in an interrupted condition one of the electric circuits leading to the broil element.

The broil lever and the contact arm 24 are operatively connected together in such a manner that the broil lever may or may not be affected by the operation of the contact arm, as desired. Appropriate connections are provided between the dial and the switch mechanism to permit manual setting of the switches and thermostatic regulation thereof in any desired manner.

An operating link 71 is pivotally mounted on a resetting link 72 at 71a. The resetting link 72 is provided with horizontally extending arms 73 which are provided with openings 74 cooperating with a pivot pin 75 carried by the bracket 76 which, in turn, is carried by the rear wall of the main housing. The operating link 71 is provided with laterally extending spaced arms 77. Each arm 77 has a raised portion 78. The arms 77, including the raised portions 78, normally extend between the broil lever 58 and the contact arm 24. The resetting link 72 is normally forced toward the contact arm and the broil lever by a spring 79, one end of which abuts the bracket 76. The distance between the raised portions of the arms 77 of the operating link is approximately the same as the distance between the adjacent faces of the contact arm 24 and the broil lever 58 when the contact bridges 43 and 55 engage their respective contacts. If the broil lever is in the position where the contact bridge thereof engages its contacts and the temperature in the oven reaches the desired setting, the movement of the contact arm so as to move the main bridges 43 away from their respective contacts will also operate, through the operating link 71, to move the broil lever to a position where the contact arm carried thereby is disengaged from the contacts 54 and 54a. The broil lever 58 will then remain in that position until manually moved into contact with the contacts 54 and 54a.

The broil lever is manually moved into a position in contact with the contacts 54 and 54a by means of the resetting link 72 and the operating bar 80. The resetting link 72 has a horizontally extending arm 81 thereon which is adapted to cooperate with a cup-shaped projection 82 on the rear face of the arm 59 of the broil lever. As the resetting link is rocked on its pivot the arm 81 engages the cup 82 and slides along the face thereof and forces the broil lever into its forward position where the contact bridge 55 engages the contacts. The resetting link is provided with an ear 83 which cooperates with the sloping face 84 of the operating bar 80. As this bar is pushed inwardly by rotation of the dial the face 84 slides over the ear 83 and rocks the resetting link on its pivot, thereby forcing the broil lever forward. By virtue of the toggle arrangement described above the broil lever will remain in this position until moved therefrom.

If the operating bar 80 is held in, the resetting link 72 and the operating link 71 carried thereby will be held in their outer position. In this position the ends 85 of the arms 77 of the operating link which project beyond the raised surfaces 78 will still be between the contact arm 24 and the arm 59 of the broil lever, the arms of the operating link being made sufficiently long to assure this. In this position the contact arm 24 can be actuated by the diaphragm and the actuating lever without moving the broil lever from closed position. The extensions 85 of the arms 77 of the operating link are spaced sufficiently far apart to permit movement of the contact arm without corresponding movement of the broil lever. The contact arm, therefore, can be actuated so as to break the circuit without disturbing the contact between the bridge 55 and the contacts 54 and 54a.

If the operating bar 80 is released after having been pushed in so as to move the broil lever into contact position, the spring 79 will force the resetting link, the bar and the operating link, back into normal position. If the diaphragm thereafter moves the contact arm 24 to a position to move the bridges 43 away from their contacts in response to an increase in temperature, this movement of the contact arm will cause the broil lever to move in a direction to move the bridge 55 away from the contacts 54 and 54a.

The rear housing 3 contains the contacts for the bake element circuit. Contacts 86 are mounted on contact arms 87 which are connected with the terminals 88 and 88a which extend from the rear housing. The contacts 86 cooperate with contacts 89 and 89a which are carried by the supplemental housing and which, through appropriate connections to be described hereinafter, are connected to the contacts 45 and 46 which are connected to the power source through the contact bridges 43. The contacts 86 are normally in contact with the contacts 89 and 89a. When it is desired to separate these contacts they are moved manually apart in a manner to be described. The end of the operating arm 80 engages a pin 90 extending from the main housing into the rear housing. The other end of the pin 90 engages an insulating block 91 which bears against the arms 87. This insulating block 91 is loosely supported on a pin 92 carried by the rear housing. As the arm 80 is moved rearwardly it moves the pin 90 rearwardly and this effects a separation of the contacts so that, regardless of whether the contact bridges 43 are in engagement with their respective contacts, no current will flow to the bake element. This condition prevails only when the adjusting dial 7 is turned to the "broil" position or to an intermediate position at which the operating arm 80 is moved rearwardly or when the arm 80 is otherwise moved rearwardly. When it is turned to the "broil" position a cam member 93, which is carried on the rear face thereof, cooperates with the operating bar or arm 80 and moves it rearwardly. As soon as the adjusting dial is turning away from the position in which the cam 93 moves the arm rearwardly, the bake circuit through the contacts just described will be reestablished, although whether current flows to the bake element depends also upon the position of the contact bars 43.

If the broil lever is in its rear position when the adjusting dial is turned to the "broil" position the operating arm 80 not only opens the contacts in the bake circuit in the manner just described, but it also moves the broil lever to forward position when the contact bridge 55 comes into engagement with the contacts 54 and 54a. If the adjusting dial is turned back toward the "off" position the contacts in the bake circuit will again close, as the arm will be moved forward by the spring 79, and the contact bridge 55 will remain in contact with the contacts 54 and 54a. When in this position a preheating operation can be carried on.

The rear housing contains additional elements which are connected into the broil element circuit for controlling the current passed through the broil circuit. One contact 100 is connected to a terminal 101. A similar contact 102 is connected to a terminal 103. These contacts are adapted to be bridged by a contact bridge 104 carried by a contact lever 105 which is pivoted on a projection 106 carried by the rear housing. The housing also carries a bracket 107 which has an upwardly extending arm 108 secured thereto. A compression spring 109 extends between the arm 108 and the contact arm 105 and normally forces the contact bridge 104 carried by the upper end of the contact arm 105 into engagement with the contacts 100 and 102. A pin 111 extends between the insulated extension 56 of the broil lever and a rearwardly extending arm 112 carried by the contact arm 105. A hole is provided in the contact arm 105 to permit the pin to extend therethrough and into engagement with the arm 112. As the broil lever is moved to a position to disengage the contact bridge 55 and the contacts 54 and 54a, the pin 111 moves the bridge 104 away from the contacts 100 and 102. As it does so the bridge 104 bridges the contacts 113 and 114 which are carried in the rear housing. The contact 113 is just an extension of the contact 102 which is connected to the terminal 103. The contact 114, however, is not connected with the contact 100 in the same manner but is separate and this contact is appropriately connected to the contact 54. By virtue of this arrangement and the wiring shown, the connections in the broil element circuit are automatically modified upon thermostatic operation of the broil lever in such a manner as to reduce the voltage impressed on each portion thereof and hence the heat output.

In the structure shown in the drawings, a cam 120 is mounted on the rear face of the adjusting dial in addition to the cam 93. The cam 120 may be dispensed with in the event that it is desired to provide a structure which will not, when it is normally turned to a baking position, close a circuit to the broil element. As shown in my copending application referred to above, no such cam need be used, it being necessary only to turn the adjusting dial to the "broil" position before turning it to the desired intermediate position whenever it is desired to have a preheating operation automatically followed by a baking operation. However, in the structure shown in the drawings the cam 120 is positioned so that when the adjusting dial is turned to a point representing a temperature of about 150° the cam 120 will push the operating arm 80 inwardly in order to set the device for a preheating operation. The only advantage of the positioning of a cam at this point is that it renders it unnecessary to first turn the dial to its uppermost position before turning it to the intermediate position. The cam 120 is of such character that the arm 80 will ride up on it and then slide down on the other side, so that there is only an in and out movement of the operating arm. As is apparent from what has been stated above, this movement will not disrupt the baking circuit except momentarily. The cam 120, as will be apparent from what has been stated, can be located at any suitable point on the dial or it can be totally eliminated and the cam 93 used for setting the device for a preheating operation to be followed by a baking operation.

Referring now to Figure 15, it will be evident that when the dial of the structure just described is rotated to a baking position of, say, 400° F. the bridges 43 will be moved into engagement with the respective contacts and the contact bridge 55 will be moved into engagement with the contacts 54 and 54a and the contact bridge 104 moved into engagement with the contacts 100 and 102. When in this position, by virtue of the connections shown, the bake element and sections A and B of the broil element will all be connected in parallel across the line for supplying current. This will effect a very rapid preheating of the oven. As soon as the desired temperature is reached the thermostat moves the contact bridges 43 away from their contacts and, at the same time, it moves the contact bar 55 away from the contacts 54 and 54a, and the contact bar 104 away from the contacts 100 and 102. The contact bar 104 is moved into engagement with the contacts 113 and 114. As soon as the temperature in the oven drops below the desired point the thermostat actuates the contact bars 43 into engagement with their contacts, but the contacts in the broil element circuit are not modified by this movement. When in this position the bake element is connected across the line and sections A and B of the broil element, instead of being in parallel, are in series. This shifting of the broil elements from a parallel relationship to a series relationship effects a reduction in the voltage passing therethrough, and hence the heat supplied by the broil element is materially reduced during the baking operation.

When it is desired to use the broil element only in the arrangement just described the adjusting dial is turned to the "broil" position. This opens the bake circuit and closes the broil circuit in such a way that elements A and B thereof will be in parallel and hence will receive maximum voltage.

Where the auxiliary cam 120 is used and is located at a relatively low point on the dial it is impossible to provide for a baking operation without a preheating operation. However, in order to obtain a structure in which a baking operation can be obtained without a preheating operation it is merely necessary to eliminate entirely the cam 120. When this is eliminated it is possible to turn the adjusting dial from the "off" position to any position throughout the usual operating temperatures without causing the broil switch to be closed. In order to obtain the rapid preheating of the oven it is merely necessary to turn the adjusting dial first to the "broil" position and then back to the intermediate position. When it is turned to the "broil" position the cam 93 operates to close the broil switch and to actuate switch mechanism in the bake circuit to open position. When the dial is turned back to an intermediate position the broil switch remains closed and the switch mechanism in the bake circuit is closed so that the preheating operation can be carried out. In view of the mechanism described, upon the conclusion of the preheating operation the main switch and the broil circuit are open and the circuit to the broil element is either totally interrupted or the connections are so changed that the impressed voltage is reduced.

In Figures 13, 14 and 16 I have shown a modification of my invention. The structure shown in these figures is similar to the structure described above except that provision is made for obtaining no current flow through the broil element during the baking operation following a preheating operation. The structure of the regulator shown in Figures 13, 14 and 16 is the same as the structure just described except that the contacts 113 and 114 of the structure just described are not present in this device.

In this embodiment the contacts 125 and 126 are connected to the power source. When the main thermostatically actuated switch mechanism is closed the contact bar 127 bridges the contacts 125 and 128 and the contact bridge 129 bridges the contacts 126 and 130. When in this position current will be supplied to the bake element when the parts are so arranged that the switch mechanism indicated generally by the reference character 131 in the bake circuit is closed. If the device has been set for a preheating operation the contact bridge 132 bridges the contacts 133 and 134 and the contact bar 135 bridges the contacts 136 and 137. When the parts are in this position the bake and broil elements are connected in parallel and current is supplied thereto. At the termination of the preheating operation the mechanism described above operates to open the main thermostatically actuated switch mechanism, and the switch mechanism in the broil element circuit. When opened, contact bars 132 and 135 are out of engagement with their respective contacts, and they remain in this position during the continuance of the heating operation even though the main thermostatic switch mechanism is again actuated by the thermostat upon a drop in temperature.

With a device of this character either of the types of adjusting dials discussed above may be used, so that the bake and broil elements are both connected to the line on rotation of the dial from the "off" position directly to an intermediate position, or when the dial is rotated from the "off" position to the broil position and then back to an intermediate position. A dial of the type described hereinafter which is mounted for axial movement may also be used so that the broil element may be connected to the power source at any dial setting.

It will be apparent from what has been stated that with this device a baking operation alone can be obtained without any current being fed to the broil element, that a broiling operation alone can be obtained without any current being fed to the bake element and that a preheating operation which is to be followed by a baking operation can be obtained, as the device will selectively connect either the bake or the broil or both elements to the line.

In Figure 17 I have shown a further modification of my invention. The structure utilized in this modification is the same as that disclosed in Figures 1 to 12 inclusive except that the contacts 100 and 102 are not utilized.

In this embodiment of the invention the contact 140 and the contact 141 are connected to the lines of a two-wire power source or to the outside lines of a three-wire power source. The contact bridge 142 and the contact bridge 143 are arranged to be actuated by the thermostatic mechanism in the manner described above. The contact bridge 142 bridges contacts 140 and 144, and the contact bridge 143 bridges the contacts 141 and 145 in order to control the supply of current to the baking and the broiling elements. A switch mechanism indicated generally by the reference character 146, which is similar to the switch mechanism in the bake circuit in the principal embodiment described above, is included in the bake circuit of this embodiment. This switch is normally closed, and, unless it is held in open position, when the main thermostatic switch mechanism is closed current is supplied to the bake element at full voltage. A contact bridge 147 bridges the contacts 148 and 149. This contact bridge 147 is similar to the contact bridge 55 of the first embodiment discussed above and is carried by the broil lever. When this contact bridge is in the position shown in Figure 17 and the main thermostatic switch mechanism is closed, the unit A of the broil circuit only will be connected to the power source through the connections shown. This element will be in parallel with the bake element and, as is apparent, is connected across the full voltage of the power source. At the termination of a preheating operation the contact bar 147 is moved to and held in open position. This movement actuates the pin 150 and this moves the contact bridge 151 into position to bridge the contacts 152 and 153. When in this position and when the main thermostatic switch mechanism is closed again, current will flow through section A of the broil element and through the resistor section B which is connected to the neutral or third wire of the three-wire current supply. Under such circumstances a materially reduced voltage is supplied to section A of the broil element circuit, and during the continuance of the baking operation following the preheating operation some current will be supplied to the broil element but it will be at this lower voltage.

As will be apparent to those skilled in this art, it is possible with this arrangement to obtain a reduced amount of heat from the broil element during the baking operation following a preheating operation by merely connecting the contact 152 to the third or neutral wire of a three-wire current source as indicated in dotted lines. Of course, where an auxiliary resistor or section B is used, greater reduction of the heating current supplied to the broil element will be had.

It will be evident from what has been stated above that with this embodiment the broil element circuit, either at full voltage or at a reduced voltage, is always connected to the power source during any preheating and baking operations, although the bake element is not connected to the power source when it is desired to employ the broil element alone. It will also be evident that a dial with a suitably located cam thereon for actuating the main operating arm will be chosen in accordance with the desired operating cycles.

As stated above, in order to obviate the necessity of either turning the dial first to the broil position and then back to the desired setting in order to obtain a rapid build up of the temperature in the compartment or oven, or positioning an auxiliary cam such as the cam 120 at a point on the dial where the broil element can be brought into the circuit at a relatively low temperature, an axially movable dial can be provided which, upon being moved axially, will actuate the operating arm 80 to connect the broil circuit to the line. In Figure 18 I have shown a dial of this character. As shown in Figure 18 the dial 175 is mounted on the bushing 176. This bushing is interiorly threaded for cooperation with the adjusting screw 177. The dial 175 and the sleeve 178 are arranged so that they will slide axially along the bushing 176 when axial pressure is applied to the dial. The dial is normally urged toward the right as shown in Figure 18 by a compression spring 179. When axial pressure is applied to the dial it will be moved along the bushing toward the front cover plate 180 and this movement will operate the bar 80 which, in turn, will close the main broil switch. The adjusting screw is provided with a pin 181 which cooperates with a forked member 182 carried by the main portion of the dial. The forks in this embodiment are made sufficiently long to permit the axial movement of the dial relative to the adjusting screw 177. It will be evident that with this arrangement it is only necessary to push the dial in in order to connect the broil element, so that it will be energized when the main thermostatic switch is closed. It also will be evident that this can be accomplished at any temperature setting above room temperature.

It will be evident from what has been stated above that the present invention provides a structure embodying thermostatically actuated switch mechanism including an automatic throw-out, stay-out switch for automatically altering the heating operation during its continuance. It will also be evident that a wide variety of results may be accomplished with a structure of this character within the scope of my invention.

While I have shown and described a preferred embodiment and several modifications of my invention, it will be understood that my invention is not limited thereto but may be otherwise embodied within the scope of the appended claims.

I claim:

1. In a temperature regulator for an electric heating appliance including two independent heating elements, the combination of a switch for each element for controlling the supply of current thereto, thermo-responsive mechanism for controlling the switches including an element responsive to temperature changes in the appliance, a handle for adjusting said mechanism to different temperature settings, said mechanism being operable manually on movement of the handle from an "off" position to an intermediate position to cause closing of both switches, and means responsive to subsequent opening of one switch upon thermostatic operation of said mechanism for maintaining the switch in its open position out of the influence of said mechanism while the other switch remains under control of the mechanism.

2. In a temperature regulator for an electric heating appliance including two independent heating elements, the combination of a switch for each element for controlling the supply of current thereto, thermo-responsive mechanism for controlling the switches including an element responsive to temperature changes in the appliance, a handle for adjusting said mechanism to different temperature settings, said mechanism being operable manually on movement of the handle from an "off" position to an intermediate position to cause closing of both switches, means responsive to subsequent opening of one switch upon thermostatic operation of said mechanism for maintaining the switch in its open position out of the influence of said mechanism while the other switch remains under control of the mechanism, and means operable on rotation of the handle to a point beyond an intermediate position for maintaining said first switch in its closed position irrespective of the operation of said thermo-responsive mechanism.

3. In a temperature regulator for an electric heating appliance including two independent heating elements, the combination of a switch for each element for controlling the supply of current thereto, an element responsive to temperature changes in the appliance, mechanism operable by said last element for controlling the switches, a temperature adjustment handle for varying the response of the mechanism to operation of the thermo-responsive element and movable from an "off" position to an intermediate position to cause both switches to close, and means responsive to subsequent opening of the switches by said mechanism for rendering one of the switches inoperable by the mechanism during continuance of a heating operation while the other of said switches remains operable by said mechanism.

4. In a temperature regulator for an electric heating appliance including two independent heating elements, the combination of a switch for each element for controlling the supply of current thereto, an element responsive to temperature changes in the appliance, mechanism operable by said last element for controlling the switches, a temperature adjustment handle for varying the response of the mechanism to operation of the thermo-responsive element and movable from an "off" position to an intermediate position to cause both switches to close, means responsive to subsequent opening of the switches by said mechanism for rendering one of the switches inoperable by the mechanism, and means operable by movement of the handle to another position for maintaining inoperative the element normally controlled by the other of said switches.

5. In a temperature regulator for an oven having independent baking and broiling elements, the combination of a switch for each element for controlling the supply of current thereto, thermo-responsive mechanism for controlling the switches including an element responsive to temperature changes in the oven, a handle for adjusting said mechanism to different temperature settings, means operable on rotation of the handle from an "off" position to a low temperature setting for closing the switch for the baking element, a locking member for holding the broiling switch in open position, a member operable on rotation of the handle beyond said setting to an intermediate position for releasing the locking member to cause closing of the broiling switch, said locking member being operable on subsequent opening of the broiling switch by thermostatic operation of said mechanism to lock the broiling switch in its open position, and means operable on rotation of the handle beyond said intermediate position for rendering said locking member inoperative and for rendering the baking element inoperative.

6. In a control mechanism for a pair of independent switches, the combination of thermo-responsive actuating means for the switches, a handle for adjusting said means to different temperature settings, means operable on rotation of the handle from an "off" position to an intermediate position for closing both switches, and means responsive to opening of one of the switches by the actuating means for locking said switch in its open position out of the influence of the actuating means while the other switch remains under control of the actuating means.

7. In a temperature regulator for an electric heating appliance including two independent heating elements, the combination of a switch for each element for controlling the supply of current thereto, thermal responsive mechanism for controlling the switches including an element responsive to temperature changes in the appliance, a handle for adjusting said mechanism to different temperature settings, said mechanism being operable manually on axial movement of the handle and on rotation of the handle from an "off" position to an intermediate position to cause closing of both switches, and means responsive to subsequent opening of one switch upon thermostatic operation of said mechanism for maintaining the switch in its open position out of the influence of said mechanism while the other switch remains under control of the mechanism.

VICTOR WEBER.